United States Patent [19]

Richardson et al.

[11] Patent Number: 5,011,087

[45] Date of Patent: Apr. 30, 1991

[54] METHOD OF AND APPARATUS FOR CONTINUOUSLY TREATING COMMINUTED SYNTHETIC PLASTIC CONTAINERS AND PRODUCTS HAVING CONTAMINANTS BONDED THERETO FOR RECYCLING PURPOSES

[76] Inventors: Larry D. Richardson, 5755 Wade Rd., Coleman, Mich. 48618; Tommy M. Pohlman, 3525 N. Branch Dr., Beaverton, Mich. 48612

[21] Appl. No.: 522,637

[22] Filed: May 14, 1990

[51] Int. Cl.[5] ............................................ B02C 19/00
[52] U.S. Cl. ...................................... 241/5; 241/20; 241/23; 241/24; 241/29; 241/65; 241/79.1; 241/DIG. 37
[58] Field of Search ................ 241/5, 275, 23, 24, 241/29, DIG. 37, DIG. 38, 65, 79.1, 20

[56] References Cited

U.S. PATENT DOCUMENTS

| | | | |
|---|---|---|---|
| 2,609,150 | 9/1952 | Bludeau | 241/DIG. 37 X |
| 3,229,923 | 1/1966 | Conley et al. | 241/275 X |
| 4,102,503 | 7/1978 | Meinass | 241/DIG. 37 X |
| 4,251,034 | 2/1981 | Corr et al. | 241/DIG. 37 X |

FOREIGN PATENT DOCUMENTS 2031313  4/1980  United Kingdom ............... 241/275

Primary Examiner—Mark Rosenbaum
Attorney, Agent, or Firm—Learman & McCulloch

[57] ABSTRACT

A system for separating contaminants from the plastic flake obtained by granulating synthetic plastic containers and products, which have contaminants bonded thereto, has a cryogenic housing for receiving the flake and a transport mechanism incorporated with the housing for moving the flake in a flow stream through the housing. The flake is mixed with a cryogenic medium at a subzero temperature and an impeller receives the frozen flake in a flow stream. An impact wall is provided outboard of the impeller and the impeller is rapidly revolved to radially separate the flakes and hurl the flakes individually at the impact wall with sufficient force to break the bond between the flakes and contaminant.

30 Claims, 4 Drawing Sheets

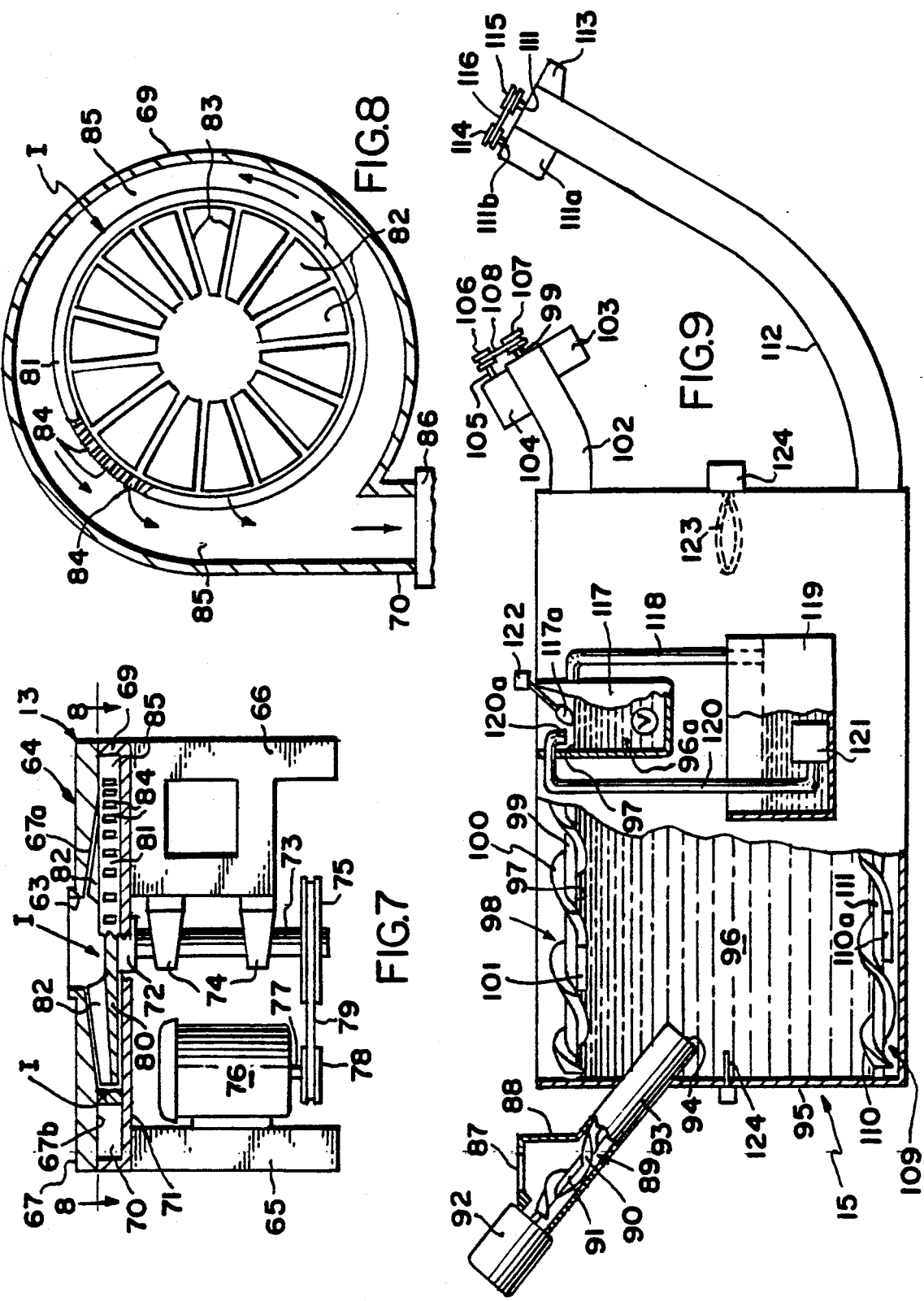

METHOD OF AND APPARATUS FOR CONTINUOUSLY TREATING COMMINUTED SYNTHETIC PLASTIC CONTAINERS AND PRODUCTS HAVING CONTAMINANTS BONDED THERETO FOR RECYCLING PURPOSES

The present invention is directed to a method of and apparatus for cleaning and separating plastic scrap granules or flakes in a continuous manner. The process and apparatus is concerned with the mechanical separation of contaminants which are bonded to the plastic flakes and cannot be readily removed without altering the chemical composition of the plastic granules. The contaminants which are removed by the process may, for example, comprise bits of paper or resin labels, glues and adhesives, metals, and other unlike plastics and materials which it is necessary to separate, such as, for example, floccing and plastic foam. In the process of separation, sawdust and dirt will also be removed. The plastic scrap recycled may, for example, be flakes obtained from the granulation of beverage bottles, milk jugs, soap bottles, automobile dashboard pieces with adhered padding, and multilayered sheets wherein one of the sheets is a plastic sheet.

BACKGROUND OF THE INVENTION

Cryogenic systems for separating scrap plastic particles from various contaminants, including metal, are known and include prior patented systems in which cryogenically treated articles are passed to an impact mill. Separation system patents which are known to applicant are the U.S. patents identified as follows:

| | |
|---|---|
| 2,879,005 | Jarvis |
| 3,885,744 | Drage |
| 4,025,990 | Lovette, Jr. |
| 4,073,443 | Danioni |
| 4,251,034 | Corr et al |
| 4,342,647 | McMillan et al |
| 4,406,411 | Gall et al |
| 4,483,488 | Luff et al |
| 4,809,854 | Tomaszek |

These patents disclose various improvements in the basic system. One of the problems with known processes in which impacting of the frozen flakes has occurred after cryogenic treatment is the difficulty of guaranteeing the virtually complete separation of materials which the present invention achieves because it assures that each flake is individually impacted and is not masked or shielded during impact by another flake or particle. The known systems do not individually impact the flakes in the manner to be described.

SUMMARY OF THE INVENTION

Typically, the present process is extremely useful for recycling molded plastic bottles and containers of the type used for marketing a wide variety of powders and liquids. Such bottles may comprise polyethylene terephthlate bodies bonded to high density polyethylene bases, however, the containers and products with which the invention is useful may comprise polypropylene and polyethylene and other thermoplastic and thermosetting plastics. Typically the beverage bottles will have paper or plastic film labels such as polypropylene labels bonded to the bottles by suitable glues or adhesives such as, for example, the heat-sealed gel lacquer used to secure paper labels to containers for laundry-household liquids. The bases and bodies of the containers may also be adhesively bonded. Other plastic scrap which can be usefully treated has been previously mentioned and, of course, the ultimate aim is to clean and separate the plastic flakes from contaminants so that it can be used in downstream recycling processes such as pelletizing, direct sheet extrusion, blow molding, injection molding, or direct blending with desirable plastics, for useful purposes.

The present invention is particularly concerned with a system wherein plastic flakes or granules reaching the outermost impact wall are each individually impacted to assure a complete separation from adhering impurities. In the present case, individual impaction is achieved by hurling the plastic flakes individually at and through a surrounding diffuser to a secondary impact wall. The diffuser, in the form of a ring, has equally spaced openings alignable with channels in the impeller rotor such that, as the impeller rotates, only one of the channels on the impeller can align with a diffuser hole at a time to pass flake particles traveling at speeds in the neighborhood of 14,000 feet per minute. The impeller diffuserimpact wall assembly performs the function indicated in combination with an air separator mechanism for separating fluff and contaminant fines from a cascading flow of flakes or chips, prior to feeding them to a cryogenic freezer for brittlizing the plastic scrap material and a similar cryogenic air separator which receives the impacted material and, again, in a cascaded flow, removes the fluff and fines from a cascading flow of material. When synthetic plastic flakes of differing specific gravities are involved, novel force fed flotation tank apparatus is employed to separate the different types of plastic so that they may exit in separate flow streams.

Another prime object of the present invention is to design a much more efficient and improved system for separating fluff and fines, which may comprise fluffed paper or resin label parts, and adhesive dust from a mixed granulated plastic chip stream in a continuous manner.

Another object of the invention is to provide a system which seeks to prevent frost from building up in the system.

Still another object of the invention is to provide a method and apparatus for refining scrap plastic which may be relatively economically operated under closely controlled conditions in a most reliable manner.

Other objects and advantages of the invention will be pointed out specifically or will become apparent from the following description when it is considered in conjunction with the appended claims and the accompanying drawings.

DESCRIPTION OF THE DRAWINGS

In the drawings,

FIG. 7 is a sectional elevational view of the impacter which receives the frozen flake from the freezer.

FIG. 8 is a sectional plan view taken on the line 8—8 thereof, and

FIG. 9 is a partly sectional, side elevational view of flotation separating apparatus which is employed when the plastic flake mix being processed is composed of materials with different specific gravities.

DESCRIPTION OF THE PREFERRED EMBODIMENTS

Figure 1:
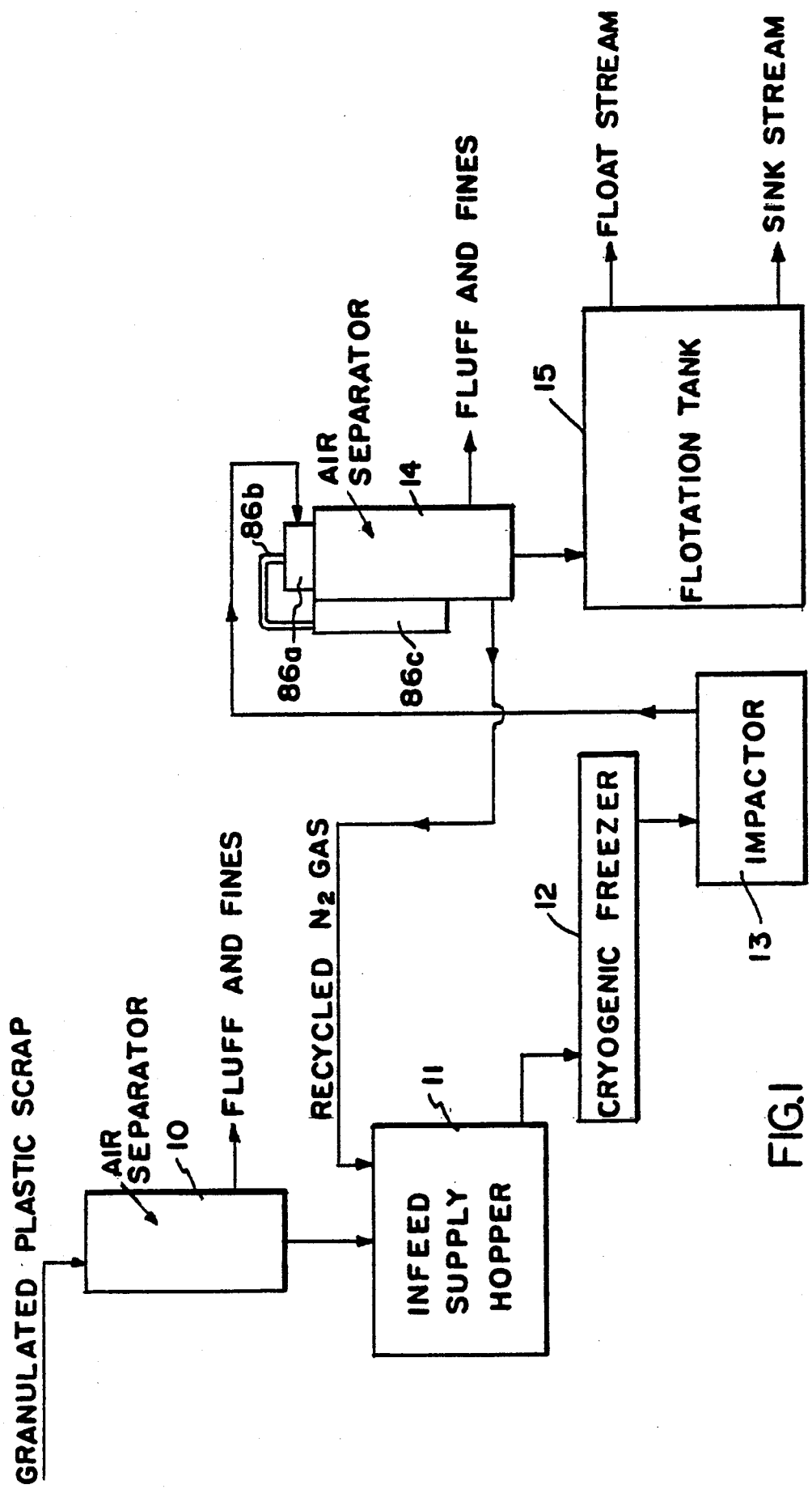
FIG. 1 is a system flow chart illustrating the steps of the method, which includes the flotation separation of different types of plastic.

The beverage bottle shown in FIG. 1 of U.S. Pat. No. 4,809,854 is a plastic container which typically may be recycled by employing the system to be disclosed herein. Such bottles are used for marketing a variety of products, including various beverages. The base portion of the bottle typically may be a high density polyethylene known as PE, which is adhesively bonded to a body molded from a greater density polyethylene terephthalate, known as PET. As indicated, labels of either a light weight plastic film such as polypropylene, known as PP, or paper, are normally employed and adhesively affixed to the body of the bottle. Such bottles, minus their usually metal caps, are first of all fed to a grinder or granulator which may be the commercially available granulator mentioned in the aforementioned patent, which is incorporated herein by reference. The comminuter may be the Nelm or Nelmor Co. Inc. model G-1830M granulator, which chops the bottles into flakes or chips of approximately ¾ inch maximum dimension. Normally these chips are generally round in configuration and are relatively thin, i.e. 0.010 to 0.030 of an inch in thickness, because the thickness of plastic used in such bottles is not great. The chips or some of them may be generally concave-convex in configuration due to the curvilinearity of the bottles.

After passing the material to a shaker screen and magnetic separator assembly to separate any metallic and oversize particles, the comminuted scrap is supplied to an air separator, generally designated 10 in FIG. 1, which is used to separate out any fluff or fines in the flow of granulated plastic flakes. In the granulator, some label fluff and fines will normally be generated, which it is best to separate out before they are contacted by any frost which tends to form in the supply hopper 11 and freezer 12. The purpose of freezer 12 is to brittelize the plastic so that it can be efficiently disintegrated in a subsequent mechanical separation of impurities in a relatively dry atmosphere in the impacter 13. From impacter 13, the product stream is fed to a cryogenic air separator 14 to separate out fluff and fines, generated in the impacting process, in a relatively dry atmosphere. After air separator 14 the material proceeds to a flotation separation tank 15, assuming that two different plastics of differing specific gravity are employed in the container and are present in the mixed scrap. The process is continuous and requires a controlled and steady infeed of granulated plastic.

Because the shape of the granulated flake from plastic bottles is the result of the contour of the bottle, individual flakes of curl contour have the capability of interlocking to cause a bridging in the container in which they are stored. This bridging tends to disrupt the continuous flow of plastic and a debridging action must be achieved to insure a controlled steady outfeed of plastic chips or flakes. This debridging is accomplished in the infeed supply hopper 11, as well as in the air separator 10.

Figure 2:
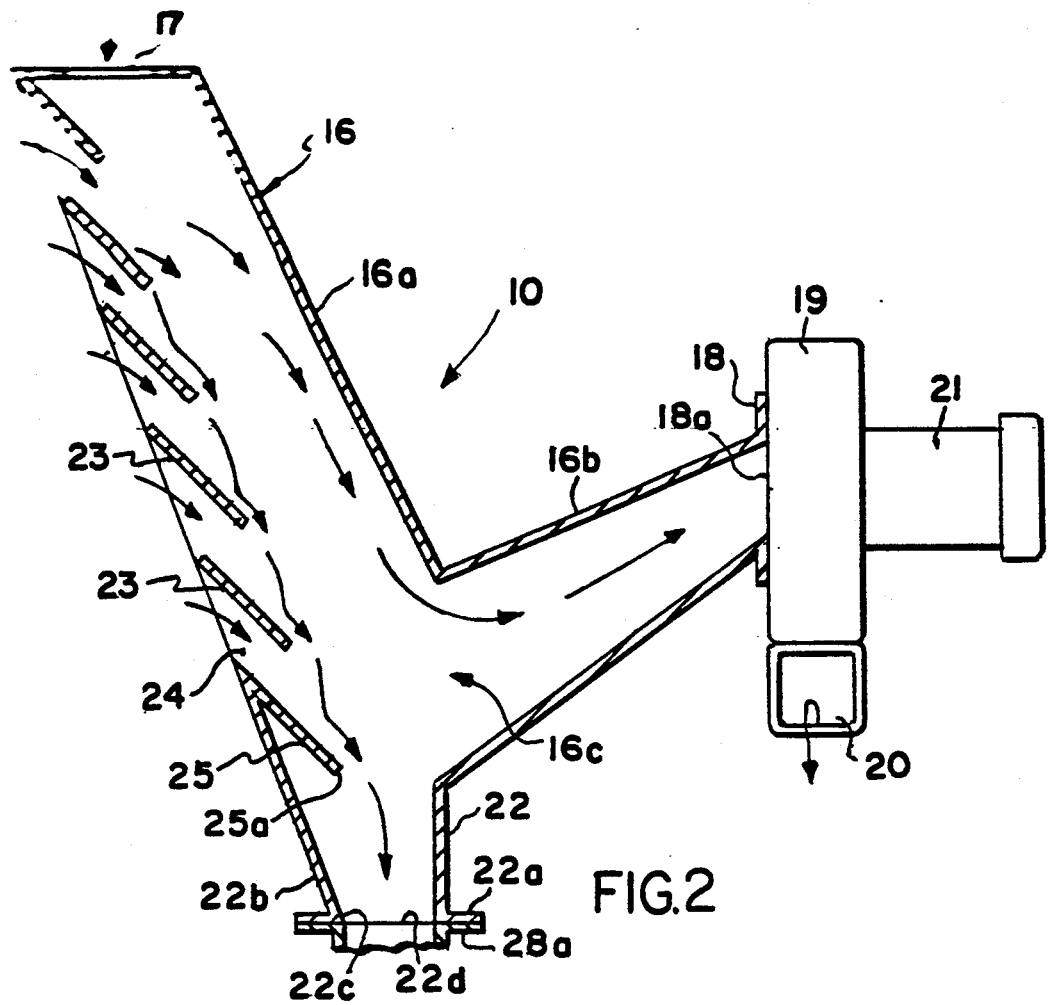
FIG. 2 is a sectional elevational view illustrating the construction of the air separators which are employed in the system.

In the separator 10, loose fluff i.e. tangled shreds of paper or resin labels and both adhesive and plastic fines, as well as dirt, sawdust and the like, are removed by the air separator 10. The separator 10 is especially designed to efficiently and reliably remove these contaminants or impurities and, as shown in FIG. 2, comprises a generally Y-shaped housing 16 of rectangular cross-section, having a material inlet opening 17 in its more vertically upright, inclined leg 16a. The opposite, considerably less inclined and shorter, also of rectangular cross-section, leg 16b, has a sealing flange 18, which connects to the input opening of a commercially available suction centrifugal fan separator 19, which has a peripheral output opening 20 for the heavier material being separated from the airstream. Suction fan blades within fan housing 19, which are driven by an electrically powered motor, draw the airstream from housing 16 and move it out air discharge duct 21, while separating the fines and fluff centrifugally from the airstream.

The duct-like housing 16 also includes a blower discharge leg 22 with a base flange 22a for attachment to the infeed hopper 11. The upper portion of the outer side wall of the housing leg 16a consists of a series of vertically spaced angular baffle plates 23 with air ingress openings 24 between them. The plates 23 are progressively inwardly staggered with respect to a lower baffle 25, which has a terminal edge 25a substantially in vertical alignment with the lower terminal edge of the wall 22b at 22c. Inlet 17 has an area equal to the area of the two outlets 18a and 22c and the suction air inlet comprising the multiple openings 24 has an area generally ten times larger than the suction air outlet 18a. The throat area inlet 16c, has an area equal to ¾ that of the leg 16a outlet. The separator body 16a generally has a width in FIG. 2 equal to twice the width of the inlet 17, with suction body 16b having a length making a smooth transition from the suction throat 16c to the outlet 18a. The velocity of the fluff and fines, mixed with the suction air, increases when passing through the smaller suction throat 16b to the outlet 18a, to cause a continuously reliable cleaning action. Baffles 23 continuously cascade the plastic chips through the suction airstream. Suction fan 19 has a cubic feet per minute capacity equal substantially to four times the air inlet capacity provided by spaces 24, so the suction air readily passes through the mixed cascading plastic stream and removes the fluff and fines to the suction fan blower 19. From blower 19, the fluff and fines, being heavier than air, will centrifugally migrate to the periphery of the duct and out discharge duct 20.

Figure 3:
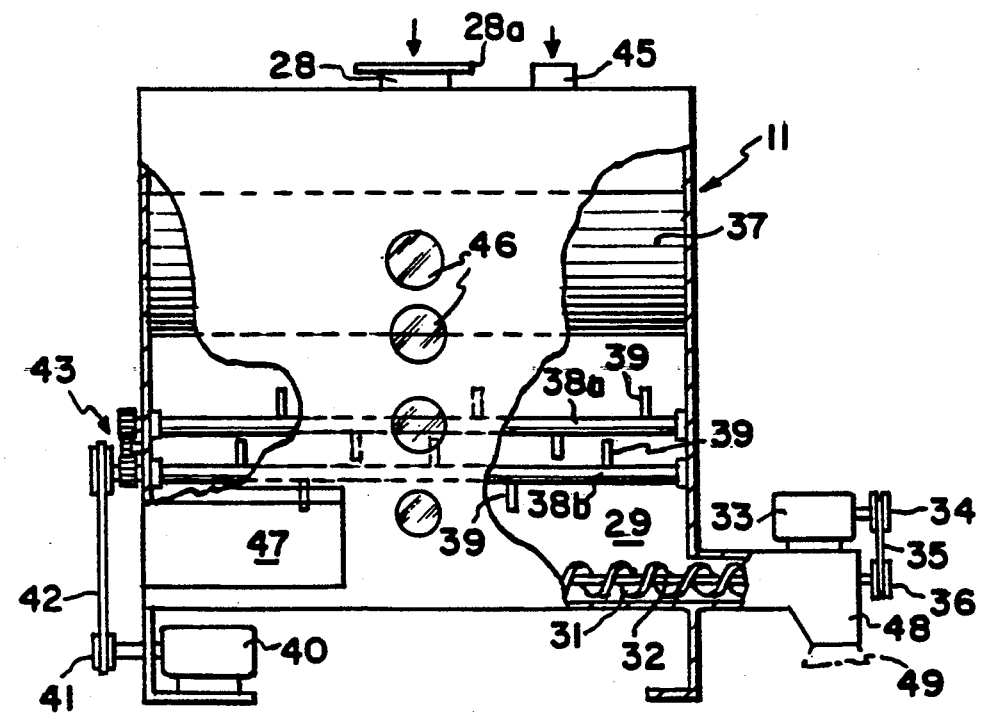
FIG. 3 is a partly sectional, reduced size, side elevational view of the cryogenic hopper which receives the material from the first stage air separator.
Figure 4:
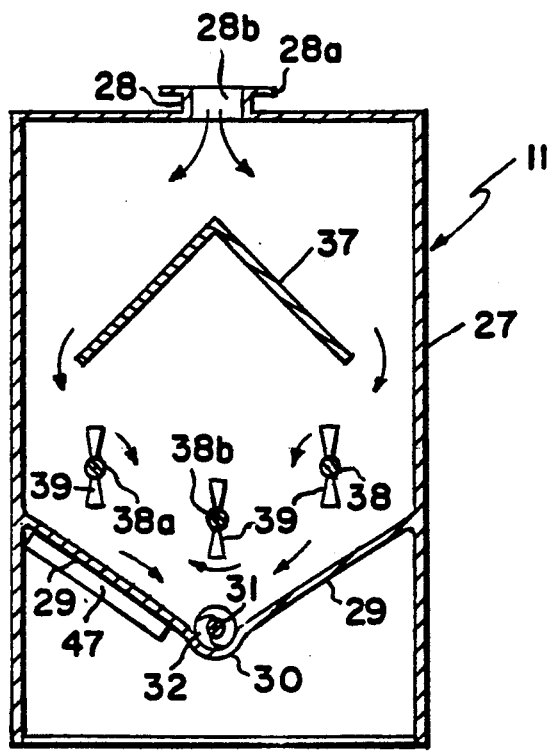
FIG. 4 is a transverse sectional view thereof.

The cryogenic infeed supply hopper 11, which is disclosed particularly in FIGS. 3 and 4, comprises a rectilinear housing 27 having an inlet 28 with a flange 28a which couples to the flange 22a of separator 11. As FIG. 4 particularly indicates, a pair of downwardly and inwardly sloped walls 29 are provided to form a bottom wall near the lower end of housing 27, walls 29 being connected at their lower ends by curvilinearly extending trough 30. A discharge auger comprising screw flight 31, fixed to a shaft 32, is positioned in trough 30 to receive material from the walls 29 and is driven by a motor 33 via an output drive sheave 34 and a belt 35 driving the sheave 36 on shaft 32. Provided centrally in the housing 27, as shown in FIG. 4, beneath the inlet 28b, is a V-shaped deflector baffle 37. Below the baffle 37, driven shafts 38, 38a, and 38b mounting agitator paddles 39 are driven in the directions indicated by the arrows to insure a controlled steady feed of the flake to screw 31. The shaves 38 may be driven by a second motor 40 (FIG. 3), via an output shaft sheave 41, a drive belt system 42, and gearing or the like 43 provided to drive the three shafts 38. The shaft 38 is driven in a counterclockwise direction in FIG. 4, whereas the shaft 38a is driven in a clockwise direction, as is shaft 38b.

An inlet pipe 45 provides for the admission of subzero nitrogen gas to the upper end of the hopper 11 in a first stage temperature lowering step. Various sight windows 46 can be provided in the sides of the housing to view the fill level and a cleanout door 47 can be provided, if desired. At its outlet end screw 31 passes material to an outlet duct 48, which is connected by way of a flexible sealed boot 49 to the upper end of cryogenic freezer 12 to maintain the integrity of the freezing atmosphere generated within housing 27 in what amounts to an initial freezing phase. The baffles 37, which direct the continuous flow of material outwardly, coupled with the counterrotating action of the agitators 39 on shafts 38 and 38a, and the rotation of the agitators on shaft 38b, which is directly above the screw 31, complete any debridging not achieved of the in the air separator 10, and further prevent the reinterlocking chips. The baffles 37, in when directing the incoming flake to the outside walls of the hopper, alleviate excess weight application to the discharge screw 31, which is open along its top completely so that the flake is continuously, and well, exposed to the subzero nitrogen gas being delivered through tube 45. Thus, initial brittlizing or freezing occurs in a first phase prior to delivery of the material in a continuous stream through boot 49 to the inlet 50 of the cryogenic freezer 29.

Figure 5:
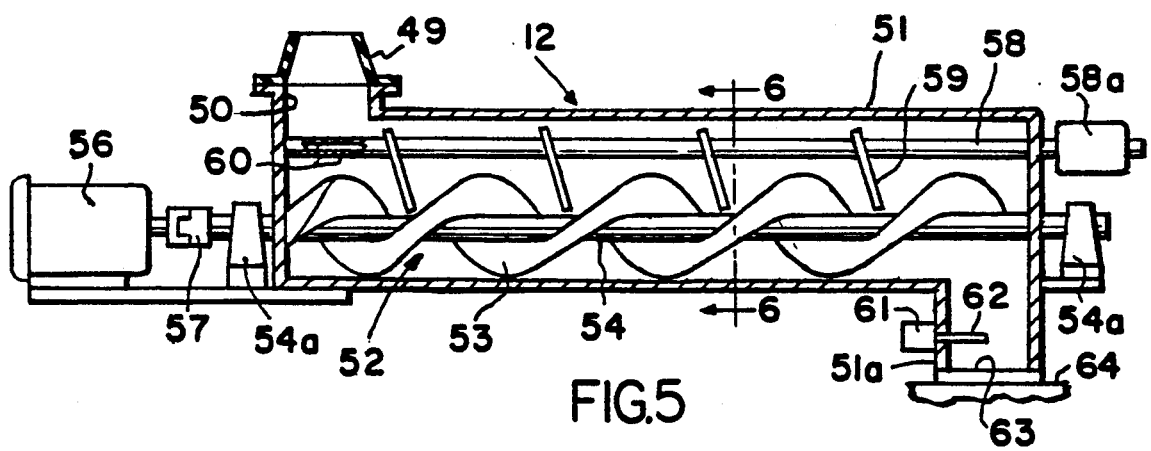
FIG. 5 is a sectional elevational view of the cryogenic freezer which receives the material from the hopper.
Figure 6:
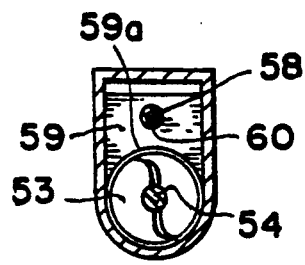
FIG. 6 is a transverse sectional view taken on the line 6—6 of FIG. 5.

The freezer 29 for continuously processing the plastic flake (FIGS. 5 and 6) comprises an elongate cylindrical housing 51 with an outlet duct 51a at its end remote from inlet 50. An auger 52, comprising a continuous advancing screw 53 on an auger shaft 54 supported by bearings 54a, is provided in the lower end of the housing 51, as shown in FIG. 5 and may be driven by a suitable electric motor 56 via a coupling 57. Provided above the auger shaft 54 is a tubular support rod 58 fixed in housing 51 and mounting fixedly a series of vertically inclined baffle plates 59 which terminate in curvilinear lower ends 59a to pass the screw flight 53 without interference.

Tube 58 is also a liquid nitrogen delivery tube, supplied via a liquid nitrogen solenoid-operated control valve source 58a, which has perforations 60 along its bottom surface from one end of the housing 51 to the other to deliver liquid nitrogen continuously through tube 58 to the upper end of the auger 52 over virtually its full length. Flake temperatures between minus 100° F. and a minus 200° F. are achieved in this manner by injecting the plastic flake directly with the liquid refrigerant. The rate of feed of plastic is such as to keep the screw full of the material being processed to insure efficient operation. The cryogenic freezer illustrated, with its open auger and baffles 59, prevents clogging and allows the escape of the gas formed by the liquid refrigerant changing from liquid to gas to insure a high efficiency. The direct mixing of the liquid refrigerant with the granulated plastic flake in a second stage of freezing in the manner indicated, insures high efficiency and permits temperature control via a sensor 61 which operates valve 58a having a sensor tip 62. Baffle plates 59 prevent the material being processed from blowing forward into the drop chute 52 as a result of the gas pressure generated by the liquid nitrogen changing phase to a gas. Baffles 59 also create a space above the rod 58 for gas escapement. Boot 49 seals the feed throat and allows for some gas expansion.

After the frozen plastic flake passes in a continuous stream through the cryogenic freezer to achieve its desired brittlizing process temperature, it is discharged into the upper inlet end 63 of the impacter 13, which is sealably coupled to the outlet duct 52 either by way of a second boot 49 or directly. Impacter 13, as shown, comprises a generally dish-shaped housing generally designated 64, supported on base supports or legs 65 and 66. Housing 64 is made up of a top wall 67 in which inlet 63 is centrally provided, a generally circular, imperforate side wall 69 which at one side terminates in a discharge chute portion 70, and a bottom wall 71, having a central opening to accommodate a trust collar or bearing 72 provided on a vertical shaft 73. Provided on the support 66 are bearings 74 which journal the shaft 73 for rapid rotation and it will be noted that a drive sheave 75 is fixed to the lower end of shaft 73, which is driven by an electric motor 76 having an output shaft 77 with a drive sheave 78 thereon. Sheave 78 drives the sheave 75 via belt 79. Fixed to shaft 73, is the impeller disk generally designated I, which is of special design to accomplish a complete separation of the contaminants from the plastic flake. The impeller I has an imperforate bottom disc 80 associated with a fixed surrounding circular diffuser ring 81. Fixed in place on the upper face of disc 80 are a series of radially extending, circumferentially uniformly spaced wedge shaped fins 82. It will be noted that the lower surface of top wall 67 is inclined downwardly and outwardly from opening 63, as at 67a, and then extends horizontally radially outwardly as at 67b. The upper surface of fins 82 incline or taper complementally to the surface 67a so that there is only an operating clearance between them and similarly there is no more than an operating clearance between the top of diffuser ring 81 and surface 67b, and the fixed diffuser ring 81 and the disc 80. The spacing of fins 82 creates uniform width channels 83 of about ⅜ of an inch in width between them. Because of the taper of surface 67a, the channels or passages 83 decrease in height in a radially outward direction so that they are about ⅜ of an inch in height at their outer ends. The diffuser ring 81 has a series of uniformly circumferentially spaced, slotted openings 84 which control the egress of flakes or chips to the space 85 surrounding ring 81 so that they can impact against wall 69 and eventually be discharged. Material cannot exit from the impeller I without passing through a slot 84 because of the close operating tolerances maintained, i.e. 0.003 of an inch. As depicted in FIG. 8, there may be fifteen fins 82, and fifteen passages 83 between them. There will be approximately double that number of openings 84 in the diffuser ring 81 but, if the number of fins on the impeller is an odd number there will be an even number of slots 84 through the diffuser ring 81. If the number of fins 82 on the impeller I is an even number, there will be an odd number of openings 84 through the diffuser ring 81, so that as the impeller I rotates, only one channel 83 will ever align with a diffuser slot 84 at any given time. When the maximum dimension of the flakes supplied to impeller I is typically ⅜ of an inch, the slots 84 will be slightly undersize, i.e. ⅜ of an inch times ⅜ of an inch in size. Thus the flakes which pass directly through openings 84 are forced through the openings individually so that when they strike the impact wall 69 they are not masked or shielded by other chips which might otherwise pass simultaneously through the opening 84 and cushion the impact with which a chip strikes the wall 69. To force chips through the slots 84 and assure the desired force of impaction of the plastic flakes, impeller I is rotated at a speed sufficient to achieve a fin top speed in the neighborhood of 14,000 feet per minute.

The impacter 13 achieves a two stage impaction for most chips. The incoming plastic flakes reaching passages 83 are accelerated by centrifugal force and funneled because of the tapered surface 67a. Because of the spacing of the slots 84 vis a vis the spacing of passages 83, the great majority of the flakes or chips, i.e. 90%, first impact against the diffuser ring, with the result that the frozen, brittelized contaminants are separated in the ring 81 and proceed as glue dust out the openings 84 with the chips which also tend to be reduced in size (i.e. to 3/16 × ⅜ of an inch) by the impacting action. These chips proceed through the openings 84 to a second impact against wall 69 and a final contaminant separation and chip reduction in size occurs. Those chips which proceed directly out an opening 84 when a passage 83 aligns radially with a slot 84 will be pushed out the openings with "machine gun" force to impact against wall 69 without any masking, because only one such chip can proceed through an opening 84 at a time. Each opening 84 is only intermittently available to the channels 83 between fins 82. The function of ring 81 is therefore to assure that only one chip at a time directly exits through each opening 84 and that the majority of the chips receive a double impaction in the sense that they first impact against the ring 81 and then, secondarily and finally, impact against the wall 69.

The flake and its separated contaminants are removed out discharge duct 70 to the air separator 14 which is of the same construction disclosed in FIG. 2 and described previously. Discharge suction fan 86 moves the stream of material entrained in the nitrogen gas and air mixture to a commercially available cyclone separator 86a which removes the relatively dry nitrogen gas from an opening in its top, passes the material to separator 14, and discharges the separated moisture bearing air stream. The dry nitrogen gas is piped as at 86b to a shroud 86c which encloses the passages 29 in the separator 14. The incoming plastic stream will be very cold and the dry nitrogen gas tends to prevent frost from forming on the inner surfaces of the air separator, which might agglomerate some of the fines and form a frosty paste which sticks to the inner surfaces of the air separator. The air separator 14 with this control of its atmosphere, tends to self clean to insure continued efficient operation of the process. The flow of nitrogen is then substantially discharged out discharge passage 21. In the separator 14, the fluff formed by paper or resin label material, and the fines which may comprise dust, glue, and plastic particles of fine size are removed out the discharge chute 20. The deflection louvers 23 causing the cascading of the mix insure the separation, even if contaminated with some frost.

If two separate types of plastic flake are involved, as in a situation where the chips from bottles having both PE and PET plastic are being processed, the plastic flakes discharged from the discharge chute 22 of the air separator 14 proceed directly to an opening 87 provided in a supply hopper 88 for an auger conveyor generally designated 89 which feeds a flotation separator tank 15. The auger 89 includes a screw 90 mounted on a drive shaft 91 connected with an electrical motor 92, and operates in a housing 93 having an open lower end 94.

The flotation tank 15 comprises a rectilinear housing 95 in which water or some other separation medium 96 is maintained at a level 97. At water level, an upper auger device, generally designated 98, comprises a drive shaft 99 with a screw flight 100 thereon. At intervals, paddles 101 are provided on the shaft 99 as shown. At its discharge end, the auger 98 is curved upwardly to conform to the shape of a discharge housing 102, which has a discharge chute 103. The shaft 99 is driven by an electric motor 104 having an output shaft 105 with a sheave 106 mounted thereon, the sheave 106 driving a sheave 107 provided on the end of shaft 99, via a belt 108. The level of water or other separating medium 96 is such that it is substantially at the level of the lower surface of shaft 99 and the lower portions of screw flight 100 and the paddles 101, when rotated to the lowermost position, are immersed in the liquid at the surface thereof.

A similar auger 109, made up of a screw flight 110 on a screw shaft 111 and like-positioned paddles 110a, is journaled in the tank 95 near the lower end thereof and similarly is curved upwardly to be operably accommodated within a discharge duct 112 having a discharge chute opening 113 above the level 97. The auger shaft 111 may be driven by an electric motor 111a having an output shaft 111b with a sheave 114 thereon which drives the sheave 115 affixed to shaft 111 via a belt 116.

To maintain the proper liquid level in tank 95, an overflow tank 117 is situated within the interior of tank 95 and supported in the position shown. It has an overflow pipe 118 which has its lower end immersed in a reservoir tank 119. A similar fill pipe 120 leads from a pump 121 in the reservoir tank 119 back to a position within overflow tank 117 in which its discharge end 120a is above the level 97 of the separation medium 96a in the overflow tank 117. A float 117a in overflow tank 117 connects with a switch 122, which is electrically connected to the pump 121 and operates the pump 121 to restore the liquid level in tank 117, when this is necessary. When float 117a senses the proper level in overflow tank 117, the pump 121 is turned off. To maintain the desired temperature of the medium 96 within the tank 95, a heating element 123 is under control of a sensor 124, which energizes the heating element 123, when additional heat is required.

The flake mix is positively fed to a location 94 substantially below the liquid surface of the medium 96. With the lower end of auger 90 immersed in the liquid 96, the chips are presetted, agitated and separated. Moreover, air bubbles are removed from the chips by the sloshing action. The lighter plastic flakes, i.e., the PE flakes, float to the top of liquid medium 96, while the heavier flakes, i.e., the PET chips descend to the bottom of the tank. The lighter flakes are moved by the auger 98 to discharge opening 103 and the heavier flakes are moved by auger 109 to the discharge opening 113. The mixing paddles 101 and 110a tend to stir the flakes so that they separate and more readily move to the augers 98 and 109. The proper separation of the chips of lighter and heavier densities is maintained by introducing the admixed chips at level 94, well below the surface of the medium 96. It is thought that, in addition to water, the medium could be a water based solution, or a mixture of gases, or any medium where density variations can be achieved. There are some metals that can also be removed from plastic flakes in the manner indicated. An operating plant in which the system is disposed may have its own granulator, or may be of the type which stores already granulated scrap and feeds it continuously to the air separator 10, first of all. It is to be emphasized that the system is continuous and that the flow of plastic chips is maintained in a continuous stream as it passes to and through each of the devices 10 through 15. Air separator 10, via the cascading deflector plates 23 and the tremendous air flow through passages 24, very effectively initially separates the fines and fluff from the plastic scrap. Again, because of the action of the chips falling upon plates 23, some debridging of clumps of chips is accomplished in the separator 10. In the supply hopper 11, a final separation of any still nested chips is accomplished by the deflector plates 37 and agitators 39. The first stage of freezing the chips is also accomplished prior to the time that the chips are fed through the chute 52 to the cryogenic freezer housing 12 at least partly by the recycled nitrogen gas separated by cryogenic separator 14 and transmitted to hopper inlet 45. In freezer 12, liquid nitrogen is intermixed with the chips as they are conveyed horizontally by the auger 52 and final brittlizing, frozen temperatures are achieved, which freeze any glues or adhesives such that when they are subjected to impact they shatter as a dust into fines of micron size or less dimension and release any label pieces bonded to the plastic thereby. The majority of chips are, as noted, subjected to two impacting stages. The great majority of chips, in separated single file in passages 83, are propelled individually at great velocities against the interior wall of ring 81. The rate of feed of chips to impactor opening 63 is correlated with the speed of rotation of impeller I so that oversupplying of the chips and clogging by the system is avoided. As the chips enter passages 83 they are centrifugally accelerated and separated radially so that they exit passages 83 in single file one at a time. The same, now reduced dimension, chips are then passed individually through the openings 84 and impact in a second stage against wall 69 to insure that any remaining bonding agent pulverizes and is released from the chips. Those chips, which pass directly through the openings 84 when a channel 83 aligns radially momentarily with a slot 84, are initially somewhat impacted by the edges of openings 84, since they must be squeezed through and then, of course, are again impacted by wall 69, after they are individually passed through the openings 84. Because the not previously fully impacted chips are individually squeezed through the openings 84, they are not masked or shielded by other chips when continuing to be propelled with great force against the wall 69. After separation of the label fluff and fines from the chips in air separator 14, a passage through flotation tank 15 is utilized when chips of different density are being simultaneously processed. With force feeding of the chips by auger 89 to a level substantially intermediate the augers 98 and 109, the highly reliable separation of the lighter chips and heavier chips to the augers 98 and 108 is accomplished, which results in their separate discharge out ducts 103 and 113.

Although preferred embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention which is defined in the following claims.

We claim:

1. A method of continuously treating comminuted synthetic plastic containers and products, having cellulosic or resin labels or other contaminants adhered thereto, wherein the containers have been reduced to flakes of plastic and/or flakes of plastic which have parts of the contaminant bonded thereto, comprising the steps of;
   a. passing the flakes in a continuous stream through a separator to remove any loose fluff and fines from the flake stream;
   b. receiving the stream continuously and passing the flakes in a continuous flow stream through a cryogenic housing subjecting the flow stream to cryogenic brittlizing temperatures;
   c. separating flakes from the flow stream and hurling them with bond disintegrating force individually against an impacting wall to impact each flake individually, without interference from other flakes of a nature which might shield the flake, to thereby yield a discharge stream comprising flakes and any contaminant fines or fluff; and
   d. continuously passing the discharge stream from step c continuously through a separator to remove any fines and/or fluff produced from the discharge stream while discharging the flakes, free of contaminants, in a flow stream.

2. The method of claim 1 wherein said containers include parts formed from two plastics having differing specific gravities and said plastics are processed together through steps a–d and then continuously fed in a common flow through a gravity separation medium, and exiting them from said medium in separate streams.

3. The method of claim 2 wherein said medium is a liquidfilled flotation tank with discharge exits from the liquid at different levels above the level of liquid in the tank.

4. The method of claim 3 wherein said tank is force fed with plastic flakes from step d by injecting the flow stream of flakes at a predetermined distance below the surface of the liquid in the tank.

5. The method of claim 4 wherein upper and lower augers extend in said tank to transport flakes of lesser and greater specific gravities to separate discharge locations, each located above the level of the liquid in the tank.

6. The method of claim 1 wherein the containers processed have paper labels with a glue adhering them to the plastic container, and said glue is brittlized by the cryogenic temperature and is separated from the flakes bearing label portions in step c by the impacting force as micron size powder to separate the label portions from the plastic flakes.

7. The method of claim 6 wherein said cryogenic temperatures are on the order of minus 100° to minus 200° F.

8. The method of claim 7 wherein liquid nitrogen is mixed with said flakes in step b.

9. The method of claim 8 wherein said flakes are subjected to centrifugal forces which hurl them against said impacting wall in step c.

10. The method of claim 9 wherein said separation of individual flakes is accomplished by directing the stream centrally to a rapidly rotating impeller having a series of circumferentially spaced, radially extending, passages in which the flakes travel in radially separated single file.

11. The method of claim 10 wherein the majority of flakes are subjected to two stage, bond disintegrating impaction forces.

12. The method of claim 10 in which said passages are surrounded by a stationary diffuser ring having undersized passages for the flakes of maximum dimension, one of the impeller and ring having an even number of passages and the other having an odd number of passages.

13. The method of claim 1 wherein the material passed through said separator are subjected to multiple air flows directed transversely to a stream flow leading to an air and fines exit and wherein the stream flow is interrupted intermittently by deflecting baffles which cause a cascading flow of the flakes to a separate flake exit.

14. The method of claim 1 wherein the flake stream from step a is passed to a supply hopper for the cryogenic housing wherein the flake stream is subjected to agitating forces which debridge the flow and separate the flakes while being subjected to the preliminary freezing temperatures of sub-zero nitrogen gas.

15. The method of claim 14 wherein said gas is admixed with the flake stream while the flake stream is being subjected to the agitating forces.

16. The method of claim 15 in which the flake stream is auger discharged from the supply hopper by an auger having an open top within the hopper so as to expose the flakes being conveyed to said gas, and which is fed with flakes by sloped walls leading to the top of the auger.

17. The method of claim 1 wherein the material from step c is passed through a cryogenic separator having a substantially dry atmosphere in a generally linear elongate stream.

18. A method of continuously treating plastic flakes produced by comminuting synthetic plastic containers and products having cellulosic or plastic labels or other contaminants bonded thereto, which comprises the steps of:
   a. passing the flakes in a flow stream through a cryogenic housing subjecting the stream to cryogenic temperatures;
   b. hurling flakes from the stream against a diffuser ring having circumferentially spaced openings which are undersized relative to the maximum dimension of the flakes and impacting them with a bond disintegrating force against the diffuser ring, and hurling said flakes through said openings and against an outer impact wall to impact each flake individually against said impact wall without interference from other flakes of a nature which might shield the flake to thereby yield a discharge stream comprising flakes and any separated contaminant or fluff generated; and
   c. passing the discharge stream from step b through a separator to remove any fines and fluff produced from the flakes while discharging the flakes, free of contaminant, in a flow stream.

19. The method of claim 18 wherein said containers include parts formed from two plastics having differing specific gravities, and said plastics are processed together through steps a–c and then fed in a common flow through a gravity separation device which exits them in separate streams.

20. The method of claim 19 wherein said device is a liquid filled flotation tank with discharge exits from the liquid at levels above the liquid.

21. The method of claim 18 wherein the flakes processed have paper or plastic label portions with a glue adhering them to the plastic flakes, and said glue is brittleized by the cryogenic temperature and removed from the flakes bearing label portions in step b by the impacting force as fines to separate label portions from the plastic flakes.

22. The method of claim 18 wherein said cryogenic temperatures are on the order of minus 100° to minus 200° F.

23. The method of claim 18 wherein liquid nitrogen is mixed with said flakes in step c.

24. The method of claim 18 wherein said flakes are subjected to centrifugal forces which accelerate them, separate them and hurl them against said diffuser ring and impact wall.

25. The method of claim 18 wherein the flow stream is initially passed to a supply hopper for the cryogenic housing wherein the flow stream is subjected to agitating forces which debridge the flow and separate the flakes while being subjected to the preliminary freezing temperatures of sub-zero nitrogen gas.

26. The method of claim 18 wherein the material from step b is passed through a cryogenic air separator in a generally linear elongate stream and subjected sequentially to multiple refrigerant gas flows directed transversely to the stream while at the same time being subjected to stream interruption deflectors which create a cascading flow of the flakes in the stream.

27. A system for separating contaminants from the plastic flakes obtained by granulating synthetic plastic containers and other synthetic plastic products which have contaminants bonded thereto comprising:
   a. a cryogenic housing for receiving the flakes;
   b. transport means incorporated with the housing for moving the flakes in a flow stream through the housing;
   c. means associated with the housing for contacting the flakes with a refrigerant medium which will subject the flakes to a flake freezing temperature;
   d. an impeller for receiving the frozen flakes centrally in a flow stream having means for channeling them radially in separated single file;
   e. an impact wall circumferentially outboard of the impeller in radial alignment therewith; and
   f. diffuser means, fixed relative to said impeller between the impeller and impact wall, and having circumferentially spaced openings; and
   g. means for rotating the impeller at speeds to hurl the flakes individually at said diffuser means, and through the openings at the impact wall with sufficient force to break the bond between the flakes and the contaminant.

28. A method of continuously treating the scrap flakes produced by comminuting plastic containers and products having cellulosic or resin labels or other contaminants bonded thereto, comprising the steps of:
   a. passing the flakes in a flow stream through a cryogenic housing while mixing them with a refrigerant to subject the stream to cryogenic brittlizing temperatures;
   b. discharging the flakes in a flow stream to an impeller having radially open closed passages; and
   c. radially separating the flakes and hurling them individually with a bond disintegrating force at and through a diffuser ring having openings of a size to pass those which are hurled directly to an opening only individually, against an impact wall to impact each flake individually without interference from other flakes of a nature which might shield the flake being impacted.

29. The method of claim 28 wherein the stream from step b is passed continuously to one leg of a Y-shaped housing having a series of progressively inwardly staggered louvres in the leg which admit refrigerant gas while subjecting the flakes to a cascading series of impacting forces which tend to dislodge frosted fluff and fines therefrom, the gas being drawn in from said leg by a suction fan located in the other leg which draws the gas stream with entrained fines and fluff into the other leg and which has means for separating the fluff and fines from the stream centrifugally, and wherein the flakes drop by gravity from the gas stream to the base of the Y-shaped housing.

30. The method of claim 28 wherein, prior to step a, the flakes are passed through a supply hopper having revolving agitators in their flow path for debridging those which are bridged together, and wherein a refrigerant is mixed with the flakes at this time in a first flake cooling step.

* * * * *